US012693983B2

(12) United States Patent (10) Patent No.: US 12,693,983 B2
Sun et al. (45) Date of Patent: Jul. 28, 2026

(54) INTERCONNECT APPARATUS FOR BUS

(71) Applicant: SUZHOU METABRAIN INTELLIGENT TECHNOLOGY CO., LTD., Suzhou (CN)

(72) Inventors: Xu Sun, Suzhou (CN); Yulong Zhou, Suzhou (CN); Gang Liu, Suzhou (CN); Tuo Li, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 20 days.

(21) Appl. No.: 18/697,410

(22) PCT Filed: Dec. 22, 2022

(86) PCT No.: PCT/CN2022/141063
§ 371 (c)(1),
(2) Date: Mar. 29, 2024

(87) PCT Pub. No.: WO2023/160192
PCT Pub. Date: Aug. 31, 2023

(65) Prior Publication Data
US 2024/0394203 A1      Nov. 28, 2024

(30) Foreign Application Priority Data
Feb. 24, 2022    (CN) .......................... 202210171742.5

(51) Int. Cl.
G06F 13/20         (2006.01)
G06F 15/163        (2006.01)
(Continued)
(52) U.S. Cl.
CPC .................................... G06F 13/20 (2013.01)
(58) Field of Classification Search
CPC ................................. G06F 13/36; G06F 21/10
See application file for complete search history.

(56) References Cited

U.S. PATENT DOCUMENTS 7,124,231 B1    10/2006  Garner et al.
2006/0075169 A1   4/2006  Harris et al.
(Continued)

FOREIGN PATENT DOCUMENTS

CN       101122893  A      2/2008
CN       101141486  A      3/2008
(Continued)

OTHER PUBLICATIONS

Chen et al., "Design and implementation of high speed data transfer system between multi-core DSP and FPGA," Application of Electronic Technique 44(12): pp. 40-43 (2018) with English abstract.
(Continued)

*Primary Examiner* — Getente A Yimer
(74) *Attorney, Agent, or Firm* — Merchant & Gould P.C.

(57)            ABSTRACT

The present application discloses an interconnect apparatus for a bus, including at least one decoder, configured to determine, according to at least one read instruction sent by at least one master device, at least one slave device corresponding to the at least one read instruction; a read instruction ID state recording component, configured to determine the slave device corresponding to the read instruction in response to the decoder, and query, on the basis of a second port of the memory, whether an interconnect apparatus contains a read instruction having the same ID as that of a current read instruction, and configured to route, on the basis of a query result, the current read instruction to a slave device buffer component or a same-ID sorting buffer component corresponding to the read instruction, and write a value into the memory on the basis of a first port of the memory.

18 Claims, 2 Drawing Sheets

(51) Int. Cl.
      G06F 16/2455      (2019.01)
      G06F 16/2458      (2019.01)

(56)                References Cited

U.S. PATENT DOCUMENTS

| | | | | |
|---|---|---|---|---|
| 2008/0059683 | A1* | 3/2008 | Sullivan | G06F 13/161 |
| | | | | 710/306 |
| 2009/0157929 | A1* | 6/2009 | Pigott | G06F 13/4291 |
| | | | | 710/110 |
| 2012/0036509 | A1 | 2/2012 | Srinivasan et al. | |
| 2013/0275686 | A1* | 10/2013 | Park | G06F 12/0831 |
| | | | | 711/146 |
| 2016/0055322 | A1* | 2/2016 | Thomas | H04L 63/0876 |
| | | | | 726/7 |
| 2016/0188501 | A1 | 6/2016 | Chan et al. | |
| 2019/0317762 | A1* | 10/2019 | Okazaki | G06F 9/3863 |

FOREIGN PATENT DOCUMENTS

| | | | |
|---|---|---|---|
| CN | 101625671 | A | 1/2010 |
| CN | 102073533 | A | 5/2011 |
| CN | 102812438 | A | 12/2012 |
| CN | 103532875 | A | 1/2014 |
| CN | 105323328 | A | 2/2016 |
| CN | 105677605 | A | 6/2016 |
| CN | 105912492 | A | 8/2016 |
| CN | 106294239 | A | 1/2017 |
| CN | 107807819 | A | 3/2018 |
| CN | 110011938 | A | 7/2019 |
| CN | 111164578 | A | 5/2020 |
| CN | 111666239 | A | 9/2020 |
| CN | 111984562 | A | 11/2020 |
| CN | 113254368 | A | 8/2021 |
| CN | 114265872 | A | 4/2022 |
| WO | 2016192217 | A1 | 12/2016 |
| WO | 2018107658 | A1 | 6/2018 |
| WO | 2023160192 | A1 | 8/2023 |

OTHER PUBLICATIONS

Chinese Search Report for Chinese Patent Application No. 202210171742.5 filed Feb. 24, 2022, without translation.
International Search Report and Written Opinion for International Patent Application No. PCT/CN2022/141063 mailed Mar. 17, 2023, with English translation of Search Report.
Yu et al., "An interconnection architecture design based on AXI4.0 bus," Electronic Design Engineering 28(15): pp. 188-193 (2020) with English abstract.

* cited by examiner

INTERCONNECT APPARATUS FOR BUS

CROSS-REFERENCE TO RELATED APPLICATION

The present application is a National Stage Application of International Application No. PCT/CN2022/141063, filed Dec. 22, 2022, which claims the benefit of priority to Chinese Patent Application No. 202210171742.5, filed with the China National Intellectual Property Administration on 24 Feb. 2022 and entitled "Interconnect Apparatus for Bus", which is incorporated herein by reference in its entirety. To the extent appropriate, a claim of priority is made to each of the above applications.

TECHNICAL FIELD

The present application relates to the technical field of chips, and in particular, to an interconnect apparatus for a bus.

BACKGROUND

With the continuous development of integrated circuits, the requirements on processing speed and performance of systems on chip (SOC) are increasingly high. As a central bridge for connecting various modules, the system bus plays an important role in the performance of the SOC, especially in systems with multiple master devices and multiple slave devices. An Advanced Microcontroller Bus Architecture (AMBA) bus is developed jointly by ARM and other chip companies, including Qualcomm, Toshiba, and Ericsson, so as to meet the requirements of SOC systems for multiple users, high performance and low consumption, and is widely applied to the SOC systems. According to the development time and usage environment of the bus, the AMBA bus may be further divided into an Advanced Peripheral Bus (APB), an Advanced High-performance Bus (AHB), and an Advanced eXtensible Interface (AXI). The functions supported by the AMBA bus are more and more complex, the speed is higher and higher, and the difficulty in development is also higher and higher.

Taking an AXI bus as an example, FIG. 1 shows an architecture diagram of an AXI bus.

The AXI bus is constructed by basic devices such as a master device, a slave device and interconnects (ICN), and is of a multi-master and multi-slave structure.

The AXI protocol defines five independent channels, and each channel implements a handshake mechanism through a data valid (VALID) signal and a receive valid (READY) signal. The five channels are respectively a read address channel (AR), a read data channel (RD), a write address channel (AW), a write data channel (WD), and a write response channel (WR).

An outstanding transaction feature is one of the reasons that an AXI bus can implement high-performance transmission, and a host can start a next transmission transaction before a current transmission transaction is completed. Therefore, there may be a plurality of in-progress transport transactions in the system. Assuming that multiple transactions can be processed in parallel by a slave device, the performance of the system may be improved. In a scenario where there is no outstanding transaction, after sending a transmission transaction, the master device waits for data returned by the slave device, and then starts next transmission. In the same application scenario, the transmission time of the outstanding transaction can be reduced.

Out-of-order transmission refers to that the master device continuously initiates two transmissions, and the response order of the slave device and the initiation order of the master device may be different. For example, a master device successively sends two read transactions to a slave device 0 and a slave device 1 respectively; as the structures, response mechanisms, etc. of the two slave devices are different, the response time of the two is different; and it may be that the slave device 1 first returns read data, and then the slave device 0 returns the data.

For many slave devices, there is a response resorting function, and a typical example is a Double Data Rate SDRAM (DDR). The DDR first receives a request of a trans A and then receives a request of a trans B. However, the trans B may be replied first, and then the trans A is replied.

As specified in the AXI protocol, two transactions continuously transmitted by a master device have the same ID, for example, a trans A accesses a random access memory (RAM) and a trans B accesses a DDR, and the two have the same ID, then when a reply is received, the master device can only first receive return data corresponding to the trans A and then receive return data corresponding to the trans B.

FIG. 2 shows a schematic architectural diagram of an AXI bus in a practical application scenario, the AXI bus includes two master devices and two slave devices, and the master devices and the slave devices realize data transmission by means of an ICN. The specific application scenarios are as follows:

Scenario 1: according to a time sequence, a master device 0 (Master_0) first sends a read instruction 0 (trans_0), and reads partial data from a slave device 0 (Slave_0), wherein the read instruction ID is 1; then, the Master_0 sends a read instruction 1 (trans_1), and reads partial data from a slave device 1 (Slave_1), wherein the read instruction ID is also 1.

Due to the outstanding transaction mechanism and the out-of-order operation mechanism, in this case, the slave device 1 may return data first; as the IDs of the two operations are the same, for the master device, the data returned first is considered to be the data returned by the instruction sent first, and a data error occurs in this case, which may cause a system error.

Scenario 2: according to the following time sequence:
a master device 0 (Master_0) sends a read instruction (transfer) request to a slave device 0 (Slave_0);
a master device 0 (Master_0) sends a read instruction (transfer) request to a slave device 1 (Slave_1);
a master device 1 (Master 1) sends a read instruction (transfer) request to a slave device 1 (Slave_1);
a master device 1 (Master 1) sends a read instruction (transfer) request to a slave device 0 (Slave_0);
Slave_0 and Slave_1 receive that the read request channel is normal. Supposing the Slave_0 is DDR, the DDR changes the reply sequence by itself, that is, the DDR receives the request of the Master_0 first, but is ready to reply to Master_1 first. If so, the Slave_0 tries to reply the data to the Master_1, but the Slave_1 request is sent by the Master_1 first, and it is specified in the AXI protocol that the Master_1 must receive the reply of the Slave_1 first if having the same ID, then can the Master_1 receive the reply of Slave_1? the Slave_1 tries to reply the Master_0 first, however, it is specified in the AXI protocol that the Master_0 must receive the reply of the Slave_0 first if having the same ID. In this way, an endless loop is formed, and the master device and the slave device both require each other to send a request first, then a deadlock is formed.

SUMMARY

One aspect of the embodiments of the present application provides an interconnect apparatus for a bus, specifically includes:

at least one decoder, configured to determine, according to at least one read instruction sent by at least one master device, at least one slave device corresponding to the at least one read instruction;

a read instruction ID state recording component, including a memory, configured to determine the slave device corresponding to the read instruction in response to the decoder, and query, on the basis of a second port of the memory, whether an interconnect apparatus contains a read instruction having the same ID as that of a current read instruction, and further configured to route, on the basis of a query result, the current read instruction to a slave device cache component or a same-ID sorting cache component of the slave device corresponding to the read instruction, and write a value into the memory on the basis of a first port of the memory, wherein the value corresponds to the query result.

In some embodiments, the decoder is further configured to select an instruction routing direction according to a read address of the read instruction sent by the master device and an address space preset by the slave device, so as to determine the slave device corresponding to the read instruction.

In some embodiments, the decoder is further configured to compare the read address of the read instruction with an address space preset by each slave device, and determine the slave device to which the read instruction needs to be routed.

In some embodiments, the read instruction ID state recording component is further configured to, in a case that it is queried through the second port of the memory that the interconnect apparatus does not contain a read instruction having the same ID as that of the current read instruction, route the current read instruction to the slave device buffer component of the slave device corresponding to the read instruction and write a value corresponding to the query result into the memory on the basis of the first port of the memory.

In some embodiments, the read instruction ID state recording component is further configured to update the number of read instructions recorded in the memory and having the same ID.

In some embodiments, updating the number of read instructions recorded in the memory and having the same ID includes:

the read instruction ID state recording component perform an RAM write operation by means of the first port of the memory, connect an ID value of the read instruction to an address line RAM_A_ADDR of the first port, and pull up write enable of the first port.

In some embodiments, the read instruction ID state recording component is further configured to, in a case that it is queried through the second port of the memory that the interconnect apparatus contains a read instruction having the same ID as that of the current read instruction, route the current read instruction to the same-ID sorting buffer component and write the value corresponding to the query result into the memory on the basis of the first port of the memory.

In some embodiments, the read instruction ID state recording component is further configured to, in a case that a buffer component idle register sort_idle is assigned a value of 1, route the current read instruction to the same-ID sorting buffer component and update the number of read instructions recorded in the memory and having the same ID.

In some embodiments, the read instruction ID state recording component is further configured to compare a arid value of the current read instruction with the sort_id of the buffer component idle register in a case that the buffer component idle register sort_idle is assigned a value of 0, route the current read instruction to the same-ID sorting buffer component and update the number of read instructions recorded in the memory and having the same ID in a case that the arid value equals sort_id, and pull down a ready signal of a read instruction channel of the bus in a case that the arid value is not equal to sort_id.

In some embodiments, the read instruction ID state recording component is further configured to, in a case that the depth value sort_depth of the same-ID sorting buffer component is greater than the number RAM_B_DOUT of read instructions having the same ID as that of the current read instruction and when RAM_B_DOUT>1, route the current read instruction to the same-ID sorting buffer component and update the number of read instructions recorded in the memory and having the same ID.

In some embodiments, the read instruction ID state recording component is further configured to pull down a ready signal of a read instruction channel of the bus in a case that the depth value sort_depth of the same-ID sorting buffer component is equal to the number RAM_B_DOUT of read instructions having the same ID as that of the current read instruction.

In some embodiments, the interconnect apparatus further includes at least one instruction arbitration component, configured to transmit, on the basis of an arbitration policy and to a slave device, read instructions buffered in at least one of the slave device buffer component and the same-ID sorting buffer component to a slave device.

In some embodiments, the interconnect apparatus further includes:

at least one ID decoder, configured to buffer data to at least one read data buffer component which corresponding to, according to an ID of a read instruction corresponding to the data returned from a device, wherein the at least one read data buffer component correspond to the at least one master device on a one-to-one basis; and at least one read instruction complete signal generating component, configured to read data from the read data buffer component and return the data to the master device, and after the data return is completed, generate a read instruction execution complete mark and an ID of a complete instruction corresponding to the data.

In some embodiments, the read instruction complete signal generating component is further configured to transmit the ID of the complete instruction to the read instruction ID state recording component;

the read instruction ID state recording component is further configured to query the number of read instructions, having the same ID as that of the complete instruction, in the interconnect apparatus on the basis of the second port of the memory after receiving the ID of the complete instruction, the apparatus is further configured to:

compare the ID of the complete instruction with a value of a buffer component sorting register to check whether they are identical, write, on the basis of a comparison result and a query result of the ID of the complete instruction corresponding to the second port of the memory, a value corresponding to the query result of the ID of the complete instruction into the memory by means of the first port of the memory.

In some embodiments, routing the current read instruction to the same-ID sorting buffer component includes:

the current read instruction is routed to the same-ID sorting buffer component, based on at least one of the following conditions: the number of read instructions, having the same ID as that of the current read instruction, in the interconnect apparatus and whether a buffer component idle register is in an idle state.

In some embodiments, the interconnect apparatus is further configured to:

in a case that the interconnect apparatus contains a read instruction having the same ID as that of the current read instruction, execute to determine whether a buffer component idle register is in an idle state;

in a case that the buffer component idle register is in an idle state, assign an ID of the current read instruction to the buffer component sorting register, and configure the buffer component idle register to be in a non-idle state;

configure an outstanding register to mark the current read instruction as an outstanding instruction; and route the current read instruction to the same-ID sorting buffer component.

In some embodiments, the interconnect apparatus is further configured to:

in a case that the buffer component idle register is in a non-idle state, compare the ID of the current read instruction with the value of the buffer component sorting register to check whether they are the same;

in a case that the ID of the current read instruction is the same as the value of the buffer component sorting register, route the current read instruction to the same-ID sorting buffer component; and in a case that the ID of the current read instruction is different from the value of the buffer component sorting register, pull down the ready signal of the read instruction channel of the bus to temporarily receive the current read instruction.

In some embodiments, the interconnect apparatus is further configured to:

in a case that the interconnect apparatus contains a plurality of read instructions having the same ID as that of the current read instruction, compare the number of read instructions, having the same ID as that of the current read instruction, in the interconnect apparatus with the depth value of the same-ID sorting buffer component, and determine, on the basis of a comparison result, whether to route the current read instruction to the same-ID sorting buffer component.

In some embodiments, the arbitration policy is configured to:

determine whether the interconnect apparatus contains an outstanding instruction on the basis of the outstanding register;

in a case that the interconnect apparatus contains the outstanding instruction, output the read instruction buffered in the slave device buffer component; and in a case that the interconnect apparatus does not include the outstanding instruction, output the read instructions buffered in the slave device buffer component and the same-ID sorting buffer component in a round-robin manner.

In some embodiments, the query result is the number of read instructions, having the same ID as that of the current read instruction, in the interconnect apparatus;

the value corresponding to the query result is the number of read instructions, having the same ID as that of the current read instruction, in the interconnection apparatus plus 1.

BRIEF DESCRIPTION OF THE DRAWINGS

To describe the technical solutions in the embodiments of present application or in the existing technology more clearly, the following briefly describes the accompanying drawings required for describing the embodiments or the existing technology. Apparently, the accompanying drawings in the following description show merely some embodiments of the present application, and a person of ordinary skill in the art may still derive other embodiments from these accompanying drawings without creative efforts.

DETAILED DESCRIPTION OF THE EMBODIMENTS

In order to make objects, technical solutions and advantages of the present application clearer, the present application is further described in details below in combination with specific embodiments and with reference to the drawings.

It should be noted that all expressions using "first" and "second" in embodiments of the present application are for the purpose of distinguishing two entities with the same name but not representing the same or identical parameters. It can be seen that "first" and "second" are only for the convenience of expression and should not be construed as limitations on the embodiments of the present application. It will not be described one by one in subsequent embodiments.

Figure 1:
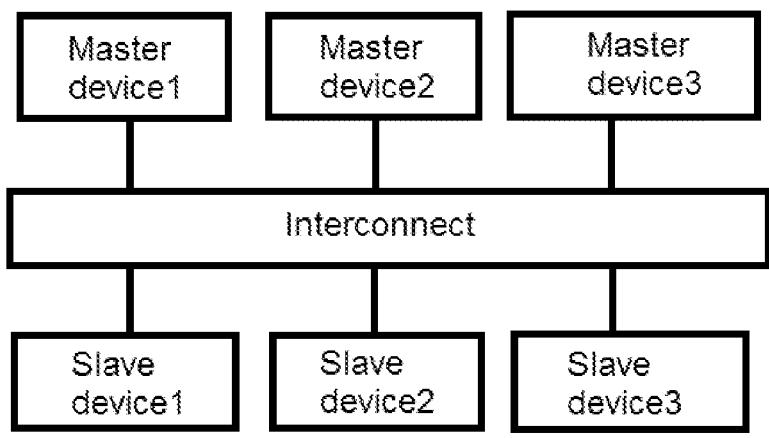
FIG. 1 is a schematic architecture diagram of an AXI bus.
Figure 2:
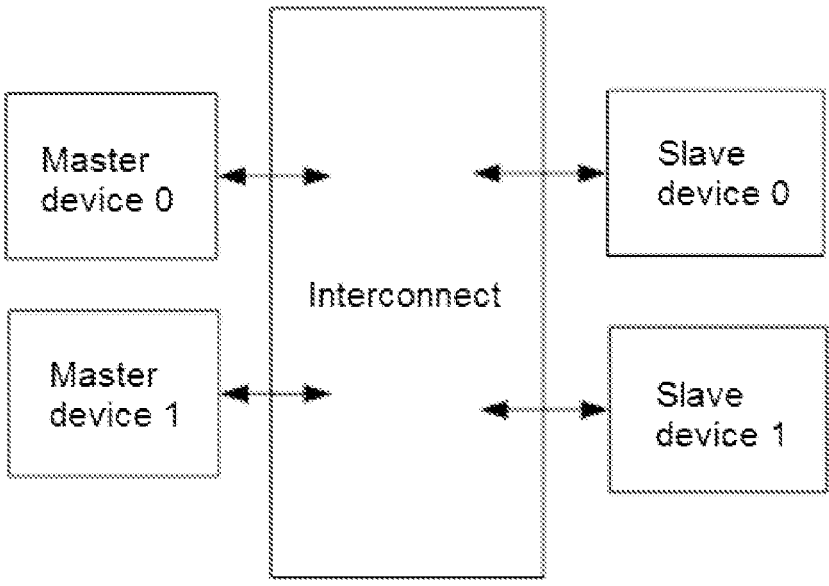
FIG. 2 is a schematic architecture diagram of an AXI bus in an actual application scenario.
Figure 3:
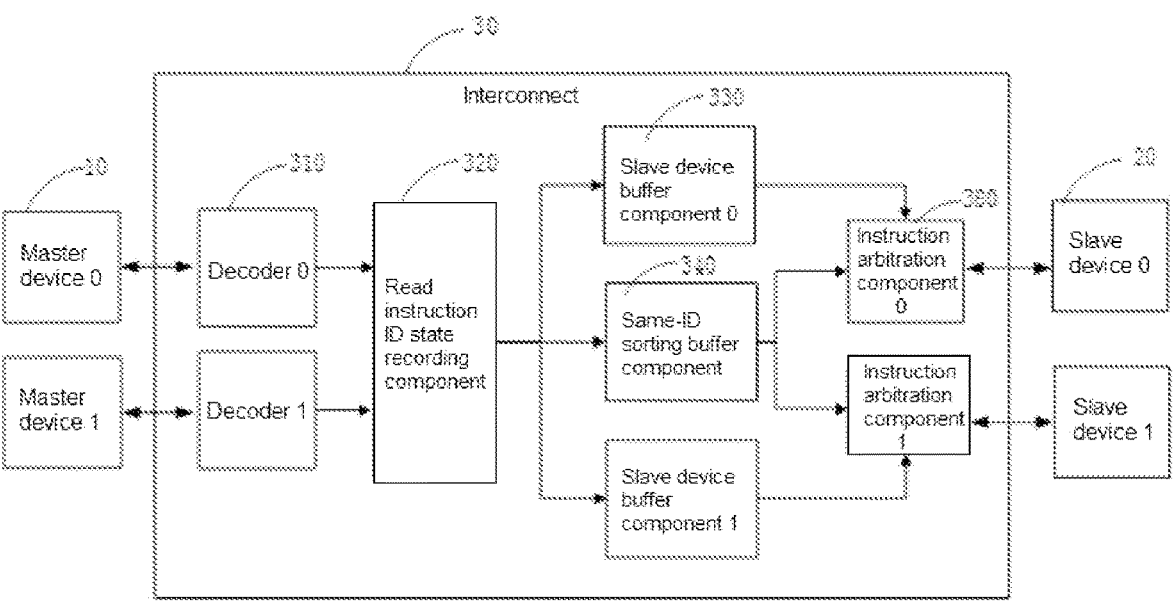
FIG. 3 is a schematic architecture diagram of an embodiment of an interconnect apparatus for a bus provided in one or more embodiments of the present application.

FIG. 3 is a schematic architecture diagram of an embodiment of an interconnect apparatus for a bus provided in the present application. The bus is connected to at least one master device 10, at least one slave device 20, and an interconnect apparatus 30. The master device 10 includes a master device 0 and a master device 1, the slave device 20 includes a slave device 0 and a slave device 1, and the master device 10 is in communication connection with the slave device 20 by means of an interconnect apparatus 30.

In the present embodiment, exemplified illustration is made on the architecture of the interconnect apparatus by taking only two master devices and two slave devices as an example, but is not limited to this structure, and the architecture is applicable to all kinds of multiple master devices and multiple slave devices.

The interconnect apparatus 30 specifically includes at least one decoder 310, a read instruction ID state recording component 320, at least one slave device buffer component 330, and a same-ID sorting buffer component 340.

The decoder 310 selects an instruction routing direction according to an address of a read instruction sent by the master device and an address space preset by the slave device, each master device corresponds to a decoder, and if there are N master devices, there are N decoders.

The read instruction ID state recording component 320 is composed of a dual-port memory, such as an RAM, and a control logic, an RAM data bit width is 4 bits (bit is a minimum component for constituting electronic information), and a data depth is 2<ar_id_width>, wherein ar_id_width is the bit width of a read instruction ID, for example, the bit width of the read instruction ID is 8 bits, then the data depth is 256, and the address of the RAM is 0-255. In a dual-port memory, the functions of a first port and a second port are predefined, for example, the first port is used for update of a state table, and the second port is used for query of an ID state.

The slave device buffer component 330 is composed of a First In First Out (FIFO) memory and is used for caching read instruction information; after passing through the decoder 310 and the read instruction ID state recording component 320, a read instruction is buffered in this component; the depth of the buffer component can be flexibly configured according to a specific usage environment; each slave device corresponds to a slave device buffer component; and if there are N slave devices, there are N buffer components.

The same-ID sorting buffer component 340 is used for buffering instructions having the same ID, and the depth thereof can be flexibly configured according to a specific usage environment, and is recorded as sort_depth, indicating that the same-ID sorting buffer component can buffer sort_depth same-ID read instructions at maximum. Different from the slave device buffer component, there is only one same-ID sorting buffer component in the interconnect apparatus.

The present application is applicable to AXI buses and buses that are similar to AXI buses and have outstanding transaction and out-of-order attributes.

The application process of the interconnect apparatus will be described as follows with reference to specific embodiments.

The master device 0 sends a read instruction (including the ID arid, read address ar_addr, read burst length ar_len, read type ar_burst, etc. of the read instruction) to the decoder.

The decoder compares the read address ar_addr of the received read instruction with the address space preset by each slave device, and determines the position of the slave device to which the current read instruction needs to be routed.

After a destination slave device of the current read instruction is determined, the read instruction ID state recording component first queries, by means of the second port of the RAM, whether the interconnect apparatus contains read instructions having the same ID as that of the current read instruction, and outputs a corresponding value RAM_B_DOUT, wherein RAM_B_DOUT is the number of read instructions, having the same ID as that of the current read instruction, in the interconnect apparatus. If the interconnect apparatus contains no read instructions having the same ID as that of the current read instruction, then RAM_B_DOUT is 0; and if the interconnect apparatus contains read instructions having the same ID as that of the current read instruction, then RAM_B_DOUT is the corresponding quantity, for example, if there is one, then RAM_B_DOUT is 1, and if there is two, then RAM_B_DOUT is 2. The specific implementation process is as follows: connecting the ID arid of a read instruction to an address RAM_B_ADDR of the second port, further pulling up an enable signal of the second port, and in this case, outputting, by a data line of the second port, corresponding data RAM_B_DOUT.

The read instruction ID state recording component writes, according to a query result of read instructions having the same ID queried by the second port of the memory, a value corresponding to the query result of read instructions having the same ID into a memory through a first port of the memory, and is used for recording the number of read instructions having the same ID in the interconnect apparatus, for example, there are ID, 1, 2 and 3, of read instructions sent by a master device, then the memories are respectively recorded, and the read instructions of the three IDs are processed in sequence.

The read instruction ID state recording component routes, on the basis of the query result, the current read instruction to the slave device buffer component or the same-ID sorting buffer component of the corresponding slave device. If it is queried that the interconnect apparatus contains no read instruction having the same ID as that of the current read instruction, that is, RAM_B_DOUT is 0, the current instruction is buffered in the slave device buffer component; if it is queried that the interconnect apparatus contains read instructions having the same ID as that of the current read instruction, RAM_B_DOUT is not 0, and the current instruction is buffered into the same-ID sorting buffer component. When the interconnected apparatus contains no or only one read instruction having the same ID as that of the current read instruction, the read instruction buffered in the device buffer component is always output; and when the interconnected apparatus contains more than one read instruction having the same ID as that of the current read instruction, the buffered read instructions are outputted from the slave device buffer component and the same-ID sorting buffer component in a round-robin manner.

The interconnect apparatus of the present application avoids problems, such as a data error caused by the outstanding transaction and out-of-order mechanism of a bus itself, or an endless Loop formed between master devices and slave devices, thereby improving the accuracy of read instructions and data returned thereby during bus data transmission, and ensuring the high-speed transmission of the read instructions and data returned thereby on the bus.

In some embodiments, the read instruction ID state recording component is further configured to, if it is queried through the second port of the memory that the interconnect apparatus does not contain a read instruction having the same ID as that of the current read instruction, route the current read instruction to the slave device buffer component of the corresponding slave device and write a value corresponding to the query result into the memory on the basis of the first port of the memory.

In some embodiments, the read instruction ID state recording component is further configured to, if it is queried through the second port of the memory that the interconnect apparatus contains a read instruction having the same ID as that of the current read instruction, route the current read instruction to a same-ID sorting buffer component and write a value corresponding to the query result into the memory on the basis of the first port of the memory.

In some embodiments, the interconnect apparatus further includes an instruction arbitration component, configured to transmit, on the basis of an arbitration policy and to a slave device, read instructions buffered in the slave device buffer component and/or the same-ID sorting buffer component.

In conjunction with FIG. 3, the interconnect apparatus further includes an instruction arbitration component 380 which uses a customized arbitration policy to send a corresponding instruction obtained after the read instruction in the device buffer component and/or the same-ID sorting buffer component is arbitrated to a corresponding slave device. Each slave device corresponds to one instruction arbitration component, and if there are N slave devices, there are N instruction arbitration components. The same-ID sorting buffer component and the instruction arbitration component ensure that the bus is always in accurate and efficient running, thereby enhancing the reliability and applicability of the SOC.

In some embodiments, the interconnect apparatus further includes:

an ID decoder, configured to buffer data to a corresponding read data buffer component according to an ID of a read instruction corresponding to the data returned from a device, wherein the read data buffer components correspond to the master devices on a one-to-one basis; and a read instruction complete signal generating component, configured to read data from the read data buffer component and return the data to the master device, and after the data return is completed, generate a read instruction execution complete mark and an ID of a complete instruction corresponding to the data.

Figure 4:
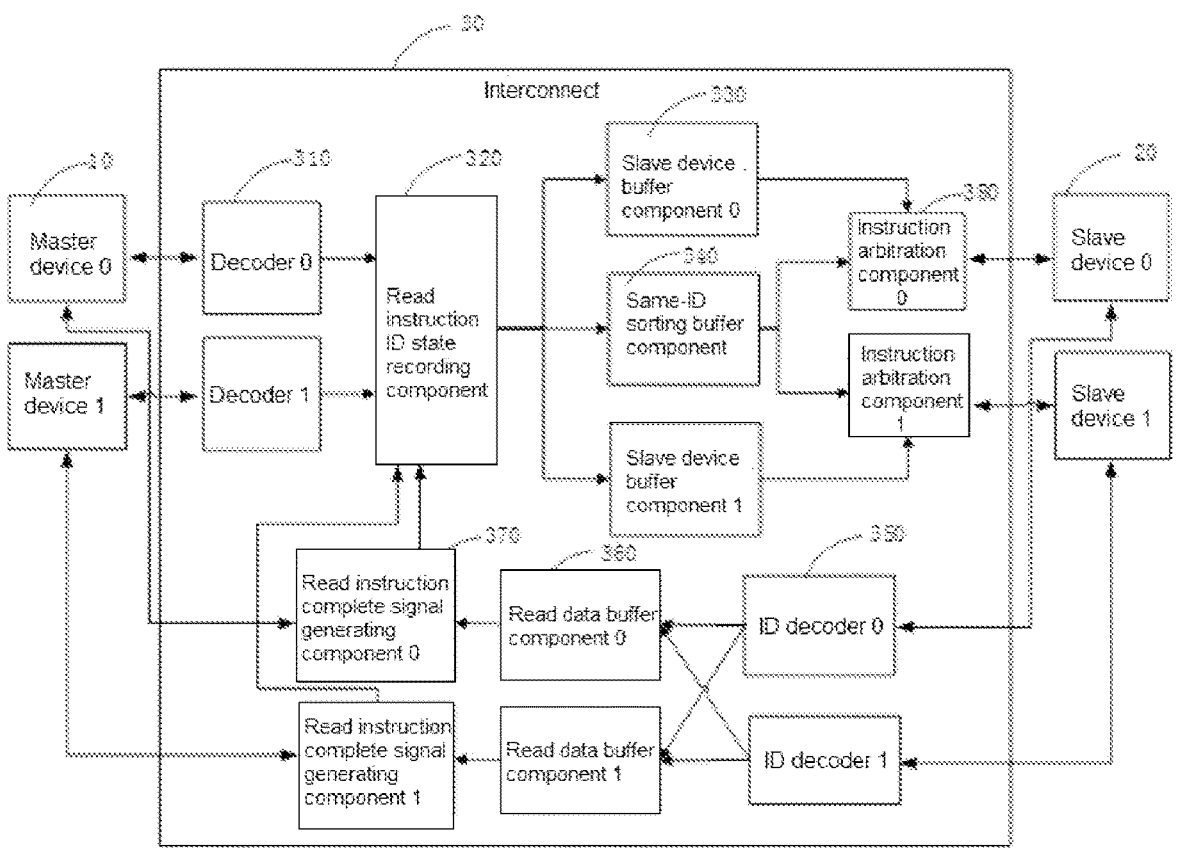
FIG. 4 is a schematic architecture diagram of another embodiment of an interconnect apparatus for a bus provided in one or more embodiments of the present application.

FIG. 4 is a schematic architecture diagram of another embodiment of an interconnect apparatus for a bus provided in the present application.

The bus is connected to a master device 10, a slave device 20, and an interconnect apparatus 30. The master device 10 includes a master device 0 and a master device 1, the slave device 20 includes a slave device 0 and a slave device 1, and the master device 10 is in communication connection with the slave device 20 by means of an interconnect apparatus 30.

The interconnect apparatus 30 specifically includes at least one decoder 310, a read instruction ID state recording component 320, at least one slave device buffer component 330, a same-ID sorting buffer component 340, at least one ID decoder 350, at least one read data buffer component 360, and at least one read instruction complete signal generating component 370.

The ID decoder 350 decodes the ID of the instruction, and routes, to a corresponding master device, data corresponding to the read instruction returned by the slave device.

The read data buffer component 360 is formed by an FIFO memory in hardware, and is used for buffering returned read data information, and the depth thereof can be flexibly configured according to a specific usage environment. Each master device corresponds to one read data buffer component, and if there are N master devices, there are N buffer components.

The read instruction complete signal generating component 370 is configured to generate a mark signal indicating that one read instruction is completed.

After receiving the read instruction, the slave device returns data corresponding to the read instruction, and returns the data to the master device by means of the ID decoder and the read data buffer component in sequence, and the read instruction complete signal generating component generates a corresponding complete signal after the return of all the read data corresponding to one read instruction to the master device is completed.

The read instruction received by the slave device is a read instruction processed by the decoder, the read instruction ID state recording component, the slave device buffer component and the same-ID sorting buffer component; in this way, it is ensured that the read instruction received by the slave device is successively received according to the time when the read instruction is sent, and thus, it is ensured that the data returned by the slave device is also returned according to the sequence in which the master device sends the read instruction, thereby avoiding problems such as an endless loop or data error of a bus, and improving the transmission accuracy while ensuring the transmission speed of a read instruction and data returned thereby.

In some embodiments, the read instruction complete signal generating component is further configured to transmit the ID of the complete instruction to the read instruction ID state recording component;

the read instruction ID state recording component is further configured to query the number of read instructions, having the same ID as that of the complete instruction, in the interconnect apparatus on the basis of the second port of the memory after receiving the ID of the complete instruction, the ID of the complete instruction is compared with the value of the buffer component sorting register to check whether they are identical, on the basis of a comparison result and an ID of a complete instruction query result of the second port of the memory, a value corresponding to the ID of the complete instruction query result is written into the memory by means of the first port of the memory.

In conjunction with FIG. 4, the read instruction complete signal generating component sends an ID of a complete instruction, i.e. an ID of a read instruction, to a read instruction ID state recording component; after receiving the ID of the complete instruction, the read instruction ID state recording component queries, by means of the second port of the memory, whether the interconnect apparatus contains read instructions having the same ID as that of the complete instruction, outputs the number of the queried read instructions having the same ID as that of the complete instruction, and writes a corresponding value into the memory by means of the first port of the memory, wherein the value is the number of queried read instructions, having the same ID as that of the complete instruction, in the interconnect apparatus minus 1, and the purpose of the ID of the complete instruction querying and writing by using the memory is to clear, from the slave device buffer component or the same-ID sorting buffer component of the interconnect apparatus, a read instruction for which data has already been returned by the slave device, so as to continue to execute read instructions of other IDs after the read instructions of one ID are completely executed.

In some embodiments, routing the current read instruction to the same-ID sorting buffer component includes:

routing the current read instruction to the same-ID sorting buffer component on the basis of the number of read instructions, having the same ID as that of the current read instruction, in the interconnect apparatus and/or whether a buffer component idle register is in an idle state.

The routing process in the present embodiment is described through the following steps:

S1, on the basis of the number of read instructions, having the same ID as that of the current read instruction, in the interconnect apparatus, and/or whether a buffer component idle register is in an idle state, a step of S1 or a step of S2 is performed;

S2, if the interconnect apparatus contains read instructions having the same ID as that of the current read instruction, the step of determining whether a buffer component idle register is in an idle state is executed;

S3, if the interconnect apparatus contains a plurality of read instructions having the same ID as that of the current read instruction, the number of read instructions, having the same ID as that of the current read instruction, in the interconnect apparatus is compared with the depth value of the same-ID sorting buffer component, and whether to route the current read instruction to the same-ID sorting buffer component is determined, on the basis of a comparison result.

Step S2 specifically includes the following steps:

S201, if the buffer component idle register is in an idle state, an ID of the current read instruction to the buffer component sorting register is assigned, and the buffer component idle register is configured to be in a non-idle state;

S203, an outstanding register is configured to mark the current read instruction as an outstanding instruction;

S205, the current read instruction is routed to the same-ID sorting buffer component.

Step S2 further includes the following steps:

S207, if the buffer component idle register is in a non-idle state, the ID of the current read instruction is compared with the value of the buffer component sorting register to check whether they are the same;

S209, if the ID of the current read instruction is the same as the value of the buffer component sorting register, the current read instruction is routed to the same-ID sorting buffer component;

S211, if the ID of the current read instruction is different from the value of the buffer component sorting register, the ready signal of the read instruction channel of the bus is pulled down to temporarily receive the current read instruction.

In some embodiments, the interconnect apparatus is further configured to:

if the interconnect apparatus contains a read instruction having the same ID as that of the current read instruction, determine whether a buffer component idle register is in an idle state;

if the buffer component idle register is in an idle state, assign an ID of the current read instruction to the buffer component sorting register, and configure the buffer component idle register to be in a non-idle state;

configure an outstanding register to mark the current read instruction as an outstanding instruction route the current read instruction to the same-ID sorting buffer component.

In some embodiments, the arbitration policy is configured to:

determine whether the interconnect apparatus contains an outstanding instruction on the basis of the outstanding register;

if the interconnect apparatus contains the outstanding instruction, output the read instruction buffered in the slave device buffer component;

if the interconnect apparatus does not include the outstanding instruction, output the read instructions buffered in the slave device buffer component and the same-ID sorting buffer component in a round-robin manner.

In some embodiments, the query result is the number of read instructions, having the same ID as that of the current read instruction, in the interconnect apparatus;

the value corresponding to the query result is the number of read instructions, having the same ID as that of the current read instruction, in the interconnection apparatus plus 1.

The specific embodiments of the present application will be described with reference to FIG. 4.

First, exemplified illustration is made to the process of sending the read instruction to the slave device by the master device.

The master device sends a read instruction (including the ID arid, read address ar_addr, read burst length ar_len, read type ar_burst, etc. of the read instruction) to the decoder. The decoder compares the read address with an address space preset by each slave device, and determines a slave device to which the current read instruction needs to be routed.

After the destination slave device of the current read instruction is determined, a read instruction ID state recording component is entered, and a first port and a second port of the RAM of the read instruction ID state recording component are correspondingly represented by a port A and a port B in the present embodiment, respectively, the read instruction ID state recording component first queries, by means of the port B of the RAM, whether the interconnect apparatus contains read instructions having the same ID as that of the current read instruction, and outputs a query result. The specific process is as follows: connecting the ID arid of the current read instruction to the address line RAM_B_ADDR of the port B, and further pulling up the enable signal of the port B of the RAM, and outputting, by the data line of the port B, the corresponding data RAM_B_DOUT on the basis of the query result.

If RAM_B_DOUT=0, it indicates that the interconnected apparatus contains no read instructions having the same ID as that of the current read instruction, and the read instruction ID state recording component routes the read instruction to the corresponding slave device buffer component according to the destination slave device determined by the decoder, and further updates the number of read instructions recorded in the RAM and having the same ID. The specific process of update is as follows: a read instruction ID state recording component performs a RAM write operation by means of the port A of an RAM, connects the value of arid to an address line RAM_A_ADDR of the port A and pulls up write enable, wherein a data input value is 1.

If RAM_B_DOUT=1, it indicates that the interconnected apparatus contains only one read instruction having the same ID as that of the current read instruction, and in this case, the following processing and determination are made:

1) if a buffer component idle register sort_idle=1, routing the current read instruction to the same-ID sorting buffer component, and further updating the number of read instructions recorded in the RAM and having the same ID. The specific process of updating is as follows: performing a RAM write operation by means of the port A of the RAM, connecting the value of arid to an address line RAM_A_ADDR of the port A, pulling up write enable of the port A of the RAM, and writing the data input value RAM_A_DIN=RAM_B_DOUT+1=2 into the RAM; assigning the value of arid to the buffer component sorting register sort_id, and further changing the buffer component idle register sort_idle to 0, which indicates that the buffer sorting component is occupied, and the buffered read instruction is an instruction of which the ID is the sort_id; then rewriting outstanding register out_st as 1; wherein the purpose of configuring the outstanding register is to mark that in the current interconnected device, the slave device buffer component and the same-ID sorting buffer component contain read instructions having the same ID, and according to the sequence of buffer time, and when the read instructions are sent to the destination slave device, the read instructions in the slave device are preferentially sent.

2) If the buffer component idle register sort_idle=0, the current and is compared with the sort_id, and there are two cases as follows:

a, if arid=sort_id, routing the current read instruction to the sort, and further updating the number of read instructions recorded in the RAM and having the same ID. The specific process of updating is as follows: performing a RAM write operation by means of the port A of the RAM, connecting the value of and to an address line RAM_A_ADDR of the port A, pulling up write enable of the port A of the RAM, and writing the data input value RAM_A_DIN=RAM_B_DOUT+1=2 into the RAM.

b) If arid!=sort_id, the read signal of the read instruction channel of the bus is pulled down, that is, since the ID of the current read instruction is different from the ID of the previous read instruction, the current read instruction is not received temporarily, and the interconnect apparatus receives the read instruction of the new ID after finishing processing the read instruction of the previous ID.

3) If sort_depth>RAM_B_DOUT>1, it indicates that there are a plurality of read instructions having the same ID in the interconnect apparatus, and the ID and of the current read instruction must be equal to sort_id, in this case, the current read instruction is routed to the sort, and furthermore, the number of read instructions recorded in the RAM and having the same ID is updated. The specific process of updating is as follows: performing a RAM write operation by means of the port A of the RAM, connecting the value of and to an address line RAM_A_ADDR of the port A, pulling up write enable of the port A of the RAM, and writing the data input value RAM_A_DIN=RAM_B_DOUT+1 into the RAM.

4) If sort_depth=RAM_B_DOUT, it indicates that there are a plurality of read instructions having the same ID in the interconnect apparatus, and the buffer space is full, and in this case, the buffer cannot be performed any more. In this case, the ready signal of the read instruction channel of the bus, such as the AXI bus, is pulled down, that is, the current instruction is not received temporarily.

The instruction arbitration component uses a customized arbitration policy to output the read instruction from the device buffer component or the same-ID sorting buffer component to a corresponding slave device.

The arbitration policy uses a manner of combining two models: fixed priority and round-robin arbitration. Specifically:

When the outstanding register out_st is 1, the arbitration result is that the instructions of the buffer channel are always output, and the instructions of the sort channel are kept buffered and will not be output to the slave device at the subsequent stage.

When the outstanding register out_st is 0, the arbitration result is that the instructions of the buffer channel and the instructions of the sort channel are arbitrated in a round-robin manner, and are output to the slave device of the subsequent-stage, i.e. when the two channels both buffer the instructions at the same time, the two channels alternately select and output, and if only one channel has a buffer instruction, the channel instruction is directly output.

It should be noted that the interconnect apparatus further includes a plurality of registers, and in the present embodiment, exemplified illustration is made only on some registers which are used. Before the master device sends the read instruction, the outstanding register, the buffer component sorting register and the buffer component idle register are configured in the interconnect apparatus in advance, for example, the outstanding register is set to 1 to indicate that there is an outstanding instruction in the interconnect apparatus, and the outstanding register is set to 0 to indicate that there is no outstanding instruction in the interconnect apparatus; the buffer component sorting register is configured to record the number of read instructions having the same ID, and the initial value of the buffer component sorting register is 0; the buffer component idle register is set to 0 to indicate that the same-ID sorting buffer component is occupied, and the buffer component idle register is set to 1 to indicate that the same-ID sorting buffer component is in an idle state. In the foregoing embodiment, the configurations of the outstanding register, the buffer component sorting register, and the buffer component idle register are only examples, which are not limited herein, and may be freely defined by a user according to an actual application scenario.

The process of returning the corresponding data to the master device after the slave device receives the read instruction is described below.

After receiving the read instruction, the slave device returns data corresponding to the read instruction, and returns the data to the master device by means of the ID decoder Decoder_ID and the read data buffer component Buffer_D in sequence, and the read instruction complete signal generating component Comp generates a corresponding complete signal after the return of all the read data corresponding to one read instruction to the master device is completed. The specific process is as follows:

rlast is a marking signal of the last piece of data of one read operation, rvalid is a data valid mark of the read operation, rid is a read data channel return id, and rid has the same ID as that of a read instruction sent by the host.

When the reading of the returned data by the master device from the buffer component is completed, and after the return, the read instruction complete signal generating component Comp rewrites the value of the complete register comp_done as 1, and generates a corresponding complete instruction ID comp_id, comp_id=arid (the ID of the read instruction corresponding to the returned data).

The comp_done is set to 1 to indicate that one execution of the read instruction is completed and only one clock cycle is pulled up.

The comp_id is returned to the read instruction ID state recording component, and the port B of the RAM queries the number of read instructions, having the same ID as that of the comp_id, in the interconnect apparatus, and outputs a query result RAM_B_DOUT. Then, the following determination is made:

1) If comp_id=sort_id, it indicates that the returned data is data corresponding to the read instruction of the current ID. In this case, if RAM_B_DOUT=1, the number of read instructions recorded in the RAM and having the current ID is updated, that is, the data read by the port B is decreased by 1 and then written in by means of the port A, specifically: RAM_A_DIN=RAM_B_DOUT-1=0, RAM_A_ADDR=comp_id, RAM_A_WEN=1. Furthermore, the buffer component idle register sort_idle is rewritten to 1, marking that the read instructions, having the current ID, in the same-ID sorting buffer component are all to be read out, and instructions of other IDs can be received again. If RAM_B_DOUT>1, the number of read instructions recorded in the RAM and having the current ID is updated, that is, the data read by the port B minus 1 and then written in by means of the port A, specifically: RAM_A_DIN=RAM_B_DOUT-1, RAM_A_ADDR=comp_id, RAM_A_WEN=1. In this case, the outstanding register out_st is rewritten to 0, but the state of sort_idle is not changed.

2) If comp_idl=sort_id, it indicates that the returned data is not data corresponding to the read instruction of the current ID. In this case, the data read from the port B (i.e., 0) minus 1, and then written into by means of the port A, that is, RAM_A_DIN=0, RAM_A_ADDR=comp_id, and RAM_A_WEN=1.

The present application has at least the following beneficial technical effects: avoiding problems, such as a data error caused by the outstanding transaction and out-of-order mechanism of a bus itself, or an endless Loop formed between master devices and slave devices, thereby improving the accuracy of read instructions and data returned thereby during bus data transmission, and ensuring the high-speed transmission of the read instructions and data returned thereby on the bus.

Those skilled in the art will also appreciate that the various illustrative logical blocks, modules and circuits described in conjunction with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those skilled in the art may implement the described functionality in varying ways for each particular application, but such implementation decisions should not be interpreted as causing a departure from the scope of the present disclosure.

The above is the exemplary embodiment disclosed in the present application. However, it is to be noted that various variations and modifications may be made without departing from the scope defined in the claims and disclosed in the embodiments of the present application. The functions, steps, and/or actions in the method claims according to the disclosed embodiments described herein are not required to be executed in any specific sequence. The sequence number of the described embodiments of the present application are only for description, but do not denote the preference of the embodiments. In addition, the element disclosed in the embodiments of the present application may be described or required in an individual form, but may be understood as a plural form, unless clearly limited to a singular form.

It should be understood that, as used herein, the singular form "a/an" is intended to include the plural form also, unless exceptional cases are supported clearly in the context. It should be understood that "and/or" used herein refers to including any or all possible combinations of one or more than one item that is listed associatively.

Those of ordinary skill in the art would have understood that the discussion of any embodiment above is merely exemplary and is not intended to imply that the scope of the embodiments of the present application (including the claims) is limited to these examples. Under the idea of the embodiments of the present application, the technical features in the foregoing embodiments or in different embodiments may also be combined, and there are many other variations of different aspects of the foregoing embodiments of the present application, which are not provided in details for simplicity. Therefore, any omissions, modifications, equivalent replacements, improvements, etc. made within the spirit and principle of the embodiments of the present application shall all fall within the scope of protection of the embodiments of the present application.

What is claimed is:

1. An interconnect apparatus for a bus, comprising:

at least one decoder, configured to determine, according to at least one read instruction sent by at least one master device, at least one slave device corresponding to the at least one read instruction;

a read instruction ID state recording component, comprising a memory, configured to determine the slave device corresponding to the read instruction in response to the decoder, and query, on the basis of a second port of the memory, whether an interconnect apparatus contains a read instruction having a same ID as that of a current read instruction, and further configured to route, on the basis of a query result, the current read instruction to a slave device buffer component or a same-ID sorting buffer component of the slave device corresponding to the read instruction, and write a value into the memory on the basis of a first port of the memory, wherein the value corresponds to the query result, at least one ID decoder, configured to buffer data to at least one read data buffer component which corresponding to, according to an ID of a read instruction corresponding to the data returned from a device, wherein the at least one read data buffer component correspond to the at least one master device on a one-to-one basis; and at least one read instruction complete signal generating component, configured to read data from the read data buffer component and return the data to the master device, and after the data return is completed, generate a read instruction execution complete mark and an ID of a complete instruction corresponding to the data, wherein the read instruction ID state recording component is further configured to, in a case that it is queried through the second port of the memory that the interconnect apparatus contains a read instruction having the same ID as that of the current read instruction, route the current read instruction to the same-ID sorting buffer component and write the value corresponding to the query result into the memory on the basis of the first port of the memory.

2. The apparatus as claimed in claim 1, wherein the decoder is further configured to select an instruction routing direction according to a read address of the read instruction sent by the master device and an address space preset by the slave device, so as to determine the slave device corresponding to the read instruction.

3. The apparatus as claimed in claim 2, wherein the decoder is further configured to compare the read address of the read instruction with an address space preset by each slave device, and determine the slave device to which the read instruction needs to be routed.

4. The apparatus as claimed in claim 1, wherein the read instruction ID state recording component is further configured to, in a case that it is queried through the second port of the memory that the interconnect apparatus does not contain a read instruction having the same ID as that of the current read instruction, route the current read instruction to the slave device buffer component of the slave device corresponding to the read instruction and write a value corresponding to the query result into the memory on the basis of the first port of the memory.

5. The apparatus as claimed in claim 4, wherein the read instruction ID state recording component is further configured to update the number of read instructions recorded in the memory and having the same ID.

6. The apparatus as claimed in claim 5, wherein updating the number of read instructions recorded in the memory and having the same ID comprises:

the read instruction ID state recording component performing an RAM write operation by means of the first port of the memory, connecting an ID value of the read instruction to an address line RAM_A_ADDR of the first port, and pulling up write enable of the first port.

7. The apparatus as claimed in claim 1, wherein the read instruction ID state recording component is further configured to, in a case that a buffer component idle register sort_idle is assigned a value of 1, route the current read instruction to the same-ID sorting buffer component and update the number of read instructions recorded in the memory and having the same ID.

8. The apparatus as claimed in claim 1, wherein the read instruction ID state recording component is further configured to compare a arid value of the current read instruction with the sort_id of the buffer component idle register in a case that the buffer component idle register sort_idle is assigned a value of 0, route the current read instruction to the same-ID sorting buffer component and update the number of read instructions recorded in the memory and having the same ID in a case that the arid value equals sort_id, and pull down a ready signal of a read instruction channel of the bus in a case that the arid value is not equal to sort_id.

9. The apparatus as claimed in claim 1, wherein the read instruction ID state recording component is further configured to, in a case that a depth value sort_depth of the same-ID sorting buffer component is greater than the number RAM_B_DOUT of read instructions having the same ID as that of the current read instruction and when RAM_B-_DOUT>1, route the current read instruction to the same-ID sorting buffer component and update the number of read instructions recorded in the memory and having the same ID.

10. The apparatus as claimed in claim 1, wherein the read instruction ID state recording component is further configured to pull down a ready signal of a read instruction channel of the bus in a case that the depth value sort_depth of the same-ID sorting buffer component is equal to the number RAM_B_DOUT of read instructions having the same ID as that of the current read instruction.

11. The apparatus as claimed in claim 1, further comprising at least one instruction arbitration component, configured to transmit, on the basis of an arbitration policy, read instructions buffered in at least one of the slave device buffer component and the same-ID sorting buffer component to a slave device.

12. The apparatus as claimed in claim 1, wherein the read instruction complete signal generating component is further configured to transmit the ID of the complete instruction to the read instruction ID state recording component;

the read instruction ID state recording component is further configured to query the number of read instructions, having the same ID as that of the complete instruction, in the interconnect apparatus on the basis of the second port of the memory after receiving the ID of the complete instruction, the apparatus is further configured to:

compare the ID of the complete instruction with a value of a buffer component sorting register to check whether they are identical, on the basis of a comparison result and a query result of the ID of the complete instruction corresponding to the second port of the memory, write a value corresponding to the query result of the ID of the complete instruction into the memory by means of the first port of the memory.

13. The apparatus as claimed in claim 1, wherein routing the current read instruction to the same-ID sorting buffer component comprises:

routing the current read instruction to the same-ID sorting buffer component, based on at least one of the following conditions: the number of read instructions, having the same ID as that of the current read instruction in the interconnect apparatus, and whether a buffer component idle register is in an idle state.

14. The apparatus as claimed in claim 13, wherein, the interconnect apparatus is further configured to:

in a case that the interconnect apparatus contains a read instruction having the same ID as that of the current read instruction, execute to determine whether a buffer component idle register is in an idle state;

in a case that the buffer component idle register is in an idle state, assign an ID of the current read instruction to the buffer component sorting register, and configure the buffer component idle register to be in a non-idle state;

configure an outstand register to mark the current read instruction as an outstanding instruction; and route the current read instruction to the same-ID sorting buffer component.

15. The apparatus as claimed in claim 14, wherein, the interconnect apparatus is further configured to:

in a case that the buffer component idle register is in a non-idle state, compare the ID of the current read instruction with the value of the buffer component sorting register to check whether they are the same;

in a case that the ID of the current read instruction is the same as the value of the buffer component sorting register, route the current read instruction to the same-ID sorting buffer component; and in a case that the ID of the current read instruction is different from the value of the buffer component sorting register, pull down the ready signal of the read instruction channel of the bus to temporarily receive the current read instruction.

16. The apparatus as claimed in claim 13, wherein, the interconnect apparatus is further configured to:

in a case that the interconnect apparatus contains a plurality of read instructions having the same ID as that of the current read instruction, compare the number of read instructions, having the same ID as that of the current read instruction, in the interconnect apparatus with the depth value of the same-ID sorting buffer component, and determine, on the basis of a comparison result, whether to route the current read instruction to the same-ID sorting buffer component.

17. The apparatus as claimed in claim 11, wherein the arbitration policy is configured to:

determine whether the interconnect apparatus contains an outstanding instruction on the basis of the outstanding register;

in a case that the interconnect apparatus contains the outstanding instruction, output the read instruction buffered in the slave device buffer component; and in a case that the interconnect apparatus does not comprise the outstanding instruction, output the read instructions buffered in the slave device buffer component and the same-ID sorting buffer component in a round-robin manner.

18. The apparatus as claimed in claim 1, wherein the query result is the number of read instructions, having the same ID as that of the current read instruction, in the interconnect apparatus;

the value corresponding to the query result is the number of read instructions, having the same ID as that of the current read instruction, in the interconnect apparatus plus 1.

\*    \*    \*    \*    \*